United States Patent

[11] 3,580,277

| [72] | Inventor | Roger W. Gettel<br>Bloomfield Hills, Mich. |
|---|---|---|
| [21] | Appl. No. | 806,488 |
| [22] | Filed | Mar. 12, 1969 |
| [45] | Patented | May 25, 1971 |
| [73] | Assignee | Sperry Rand Corporation<br>Troy, Mich. |

[54] RELIEF VALVES WITH CONTROLLED PRESSURE OVERRIDE
10 Claims, 2 Drawing Figs.

[52] U.S. Cl. ................................................ 137/525.5
[51] Int. Cl. ................................................ F16k 15/14
[50] Field of Search ........................................ 137/525,
525.3, 525.5, 529

[56] References Cited
UNITED STATES PATENTS

| 2,070,659 | 2/1937 | Higham ........................ | 137/529 |
| 3,032,060 | 5/1962 | Huffman ...................... | 137/525.5X |
| 3,036,592 | 5/1962 | Lips ............................. | 137/525.3X |
| 3,363,729 | 1/1968 | Rumsey ....................... | 137/525 |
| 3,366,136 | 1/1968 | Burton ........................ | 137/529X |
| 3,417,768 | 12/1968 | Wasson ....................... | 137/525X |

FOREIGN PATENTS

| 531,243 | 10/1956 | Canada ........................ | 137/525.5 |

*Primary Examiner*—Robert G. Nilson
*Attorney*—Van Meter & George

ABSTRACT: A contaminant-resistant relief valve comprising a housing having an inlet connected to an outlet with a preloaded, disc-type valve adapted to prevent communication between said inlet and said outlet below a predetermined pressure setting and means for resiliently biasing said disc-type valve, said means being of an adjustable nature.

Patented May 25, 1971

3,580,277

INVENTOR.
ROGER W. GETTEL

BY

ATTORNEYS 3,580,277

RELIEF VALVES WITH CONTROLLED PRESSURE OVERRIDE

BACKGROUND OF THE INVENTION

This invention relates to power transmissions and is particularly applicable to those of the type comprising two or more fluid pressure energy translating devices, one of which may function as a pump and the other as a fluid motor. This invention generally concerns relief valves and especially those of the type which will maintain fluid pressure in said systems below a predetermined pressure.

Relief valves are generally of the spring-biased poppet type or of the sliding spool type. The former being characterized by a very wide pressure rise across the valve as flow therethrough increases, whereas the latter type valve is very sensitive to contaminants within the fluid passing therethrough. It would therefore be desirable to have a relief valve which requires a minimum pressure rise across the valve as the flow therethrough increases and yet have such a valve which is contaminant resistant.

SUMMARY OF THE INVENTION

This invention comprises an adjustable relief valve having a resiliently biased preloaded disc for preventing fluid communication between an inlet and an outlet below a predetermined pressure, said relief valve comprising a housing having an inlet passage connected to an outlet passage with a valve seat disposed between the same; a disc-type valve adapted to abut said valve seat to prevent fluid communication between said inlet and said outlet; means for preloading said disc-type valve against valve seat; and, an adjustable resilient biasing means to supplement said disc-type means.

It is therefore an object of this invention to provide a fluid pressure relief valve having a novel construction which allows fluid to be discharged therethrough with a minimum pressure rise across the valve.

It is a further object of this invention to provide such a relief valve which has no close fitting sliding parts and is, therefore, resistant to contaminated fluids operating therethrough.

It is another object of this invention to provide such a relief valve having a novel construction for preloading disc-type sealing means, and it is also a further object of this invention to provide such a relief valve which is adjustable and therefore adapted to operate over a wide range of minimum pressure settings.

Further objects and advantages of the present invention will be apparent from the following description, reference being made to the accompanying drawing wherein a preferred form of the present invention is clearly shown.

IN THE DRAWING

DESCRIPTION OF THE PREFERRED EMBODIMENT

Figure 1:
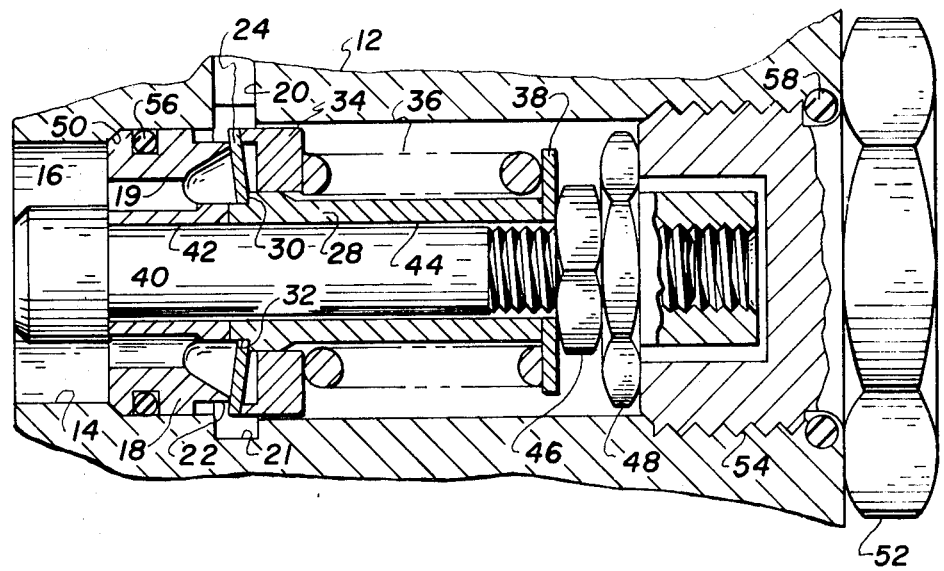
FIG. 1 is a longitudinal transverse section of a relief valve incorporating a preferred form of the present invention.

Referring now to FIG. 1 wherein there is shown a presently preferred, but merely illustrative embodiment of the inventive principles: a pressure relief valve 10. The relief valve 10 comprises a housing 12 which may be formed within a portion of a larger pressure energy translating device such as a pump. Within the housing 12, there is formed a longitudinal bore 14 in which is located the working elements of the valve 10. At the left end of bore 14, an inlet 16 is provided and is adapted to be connected to a source of high pressure energy such as a pump for the purpose of communicating system high pressure fluid to the relief valve for limiting said system pressure to a maximum predetermined value. Within the bore 14, there is provided a cylindrically shaped support element 18 having a plurality of passageways 19 which, in a particular mode of operation, are adapted to provide fluid communication between the inlet 16 and an outlet passage 20; the outlet passage being connected to an annulus 21 formed around the periphery of the bore 14, and, in turn, being adapted to be connected to a reservoir, not shown. At the right end of the support element 18, there is formed a circular valve seat 22 having a knife-shaped edge. For controlling the opening of the valve seat and thus for controlling the amount of flow passing over the valve seat 22, a movable valve member 24 is provided.

The member 24 is a resilient disc which is slightly dished to a frustum conical shape with a central hollow section therethrough and is preferably of the belleville type. The belleville member is secured in place and preloaded by means of a retaining element 28. The outer portion of the periphery of the hollow section, that is, the right side at 30, is adapted to fit within a recess 32 formed on the left end of the retaining element 28. The retaining element 28 when in a fully assembled position, is in abutment with the right end of the support element 18. When the two elements are secured together, the outer edge of the belleville disc abuts the valve seat while the inner edge is retained in the recess, with the resultant effect that the disc is compressed or preloaded. In designing the recess 32, the amount of preload of the disc can be predetermined and, further, assembly of the unit is simplified by means of inserting the disc in the recess prior to assembly. It can therefore be seen that the recess 32 provides a two fold function; that is, it provides proper alignment for the disc during assembly of the relief valve, while at the same time, providing a proper amount of preloading of the belleville disc.

Circumscribing the retaining element 28, there is provided a spring seat 34 which acts against the outer periphery of the belleville disc 24 for the purpose of providing an additional biasing force superimposed on the belleville disc. This additional biasing force is provided by means of spring 36 which is disposed between the right-hand surface of the spring seat 34 and a washer 38. The washer 38 is in abutment with the right end of the retaining element 28. The support element 18, the retaining element 28, the belleville disc 24, the spring and spring seat, and washer 38 are connected by means of a bolt 40 extending axially through bores 42 and 44 respectively formed within the support element and retaining element of which a nut 46 fastens the respective elements securely together. The bolt 40 extends through the nut 46 and is further fastened with a lock nut 48, for the purpose of preventing the unit from disassembling.

The leftward movement of the relief valve is prevented by means of abutment with chamfer 50, located within the bore 14, by the sealing valve, whereas, rightward movement of the valve element is prevented by means of a plug 52 which is threaded into the housing 12 at 54. O-ring seals are strategically placed at 56 and 58 preventing fluid from leaking past the same.

Figure 2:
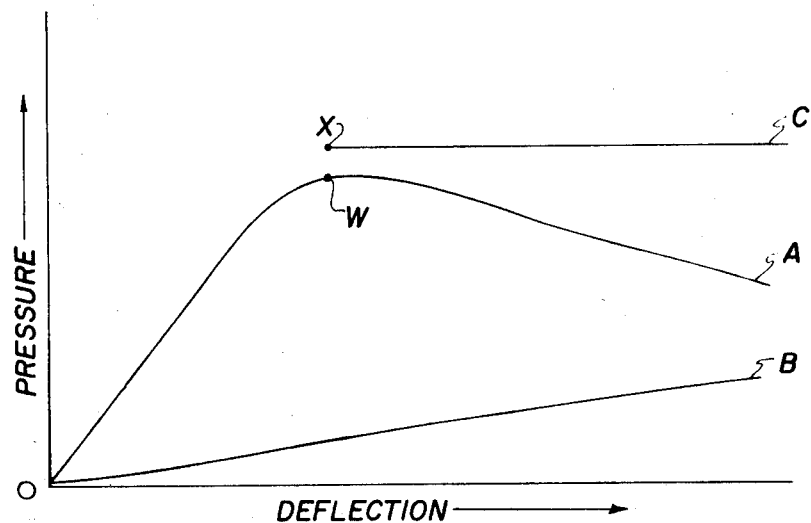
FIG. 2 is a graphic illustration illustrating the deflection versus load characteristics of the subject valve.

Referring now to FIG. 2, there is illustrated a pressure versus deflection curve in which the performance characteristics of the belleville disc and the spring are illustrated. The curve A illustrates the amount of defection of a belleville disc as a force due to the pressure acting thereon is applied to the same. It can be seen that as the pressure increases, the deflection correspondingly increases up to a maximum point W. At that point, the deflection of the belleville valve will continue to increase without a corresponding increase in pressure. Depending upon the particular type of belleville design the amount of deflection beyond the point W can be varied from a plus to a minus deflection.

Curve B illustrates a typical pressure deflection curve for a coil type spring and it can be seen that the spring pressure deflection curve is linear; that is, as the force due to the pressure acting thereon is increased, the deflection increases by a proportional amount.

The curve C illustrates the performance characteristics of the subject valve 10 and upon inspection, it can be seen that as a force due to the pressure acting thereon is applied to the valve, there is no deflection until a predetermined amount of pressure is reached in the high-pressure inlet 16. This is indicated at the point X. This is due to the preloading of the disc 24 in the manner hereinbefore described. At this point, a corresponding increase in pressure causes a deflection of the relief valve and it can be noted upon inspection that the deflection of a valve increases without a corresponding increase in pressure. Thus, a relatively flat performance characteristic is achieved for the relief valve.

This is accomplished first by preloading the belleville disc described hereinabove until it is at the point W on the pressure deflection curve. Second, by superimposing the characteristics of the coil type spring, the curve C is obtained. By referring to FIG. 2, it can be seen that the curve C is the sum of the curves A and B. Depending upon the particular type of application involved, any desired shape for the curve C may be obtained by either varying the characteristic of the belleville disc and/or the coil-type spring. For example, using a spring with a different spring rate or by using the same spring but by inserting a shim below the washer 38, will, in turn, change the ultimate characteristics of the curve C. Thus, in this sense, the valve 10 is adjustable.

It should be noted that the preloading of the belleville disc should be at a value which is somewhat less than the desired minimum setting of the valve. Since the force of the coil-type spring is to be superimposed upon that exerted by the preloaded belleville disc, the actual minimum operating setting of the valve will be at a value which is the sum of the two prings.

It can thus be seen that the present invention has provided a relief valve having a novel construction which can be easily assembled and disassembled and one which is adjustable over a wide range of pressure operating conditions, and one which is resistant to contaminated fluids operating therethrough.

While the form of the embodiment of the invention as herein disclosed constitutes a preferred form, it is to be understood that other forms might be adopted, all coming within the scope of the claims which follow:

What I claim as new and desire to secure by Letters Patent of the United States is:

1. A fluid pressure valve for preventing a system pressure from exceeding a predetermined value comprising: a housing having an inlet and an outlet; a passageway connecting said inlet to said outlet and having a valve seat means formed therein; a resilient disc (which is) contacting said seat and being slightly dished to a frustum conical shape so as to be concave toward said seat when in contact therewith, said disc cooperating near its outer edge with said valve seat for controlled fluid communication between said inlet and said outlet; means for nonyieldingly preloading said disc near its inner edge by a predetermined amount, whereby said disc exerts a force against said valve seat which is less than an opposing force exerted by said system pressure when at said predetermined value; and, resilient biasing means superimposing a second force on said disc wherein the combination of the forces exerted by said disc and said resilient means prevents fluid communication across said valve seat below said predetermined value, and permits fluid communication across said valve seat above said predetermined value.

2. A fluid pressure valve as described in claim 1 wherein said resilient biasing means comprises: a mechanical spring exerting a force against one side of said disc to urge the other side of said disc into a fluid sealing engagement with said valve seat.

3. A fluid pressure valve as described in claim 1 wherein said valve seat means comprises a generally cylindrically shaped support element having a fluid conduit extending therethrough and opening to one face of said element; a circular valve seat formed on said one face circumscribing said opening wherein said disc cooperates with said circular valve seat for controlling the passage of fluid thereacross.

4. A fluid pressure valve as described in claim 3 wherein said circular valve seat is of the knife-shaped edged type.

5. A fluid pressure valve as described in claim 3 wherein said preloading means comprises a retaining element with one end having a recess formed thereon, said recess receiving an inner annular edge portion of said disc while the other end of said disc engages said circular valve seat when one end of said retaining element abuts said face of said support element, said retaining recess and said valve seat engaging said disc on opposite sides thereof; and, means for fastening said retaining element to said support element whereby said disc is preloaded to a predetermined amount, said amount being determined by the size of said retaining element recess.

6. A fluid pressure valve as described in claim 5 wherein said resilient means exerts a biasing force against that face of the outer annular edge portion of said disc which is opposite said valve seat.

7. A fluid pressure valve as described in claim 6 wherein said resilient means comprises a mechanical spring.

8. A fluid pressure valve as described in claim 7 wherein said retainer and said support element have a bore extending therethrough wherein said fastening means extends to the opposite ends of said elements to maintain said elements fastened together, said spring being deposed between said disc and a portion of said fastening means whereby said elements, disc, and spring form a single cartridge disposed in said housing bore.

9. A fluid pressure valve as described in claim 8 wherein said circular valve seat is of the knife-edged type.

10. A fluid pressure valve as described in claim 8 wherein said disc is of the belleville-type spring type.